UNITED STATES PATENT OFFICE.

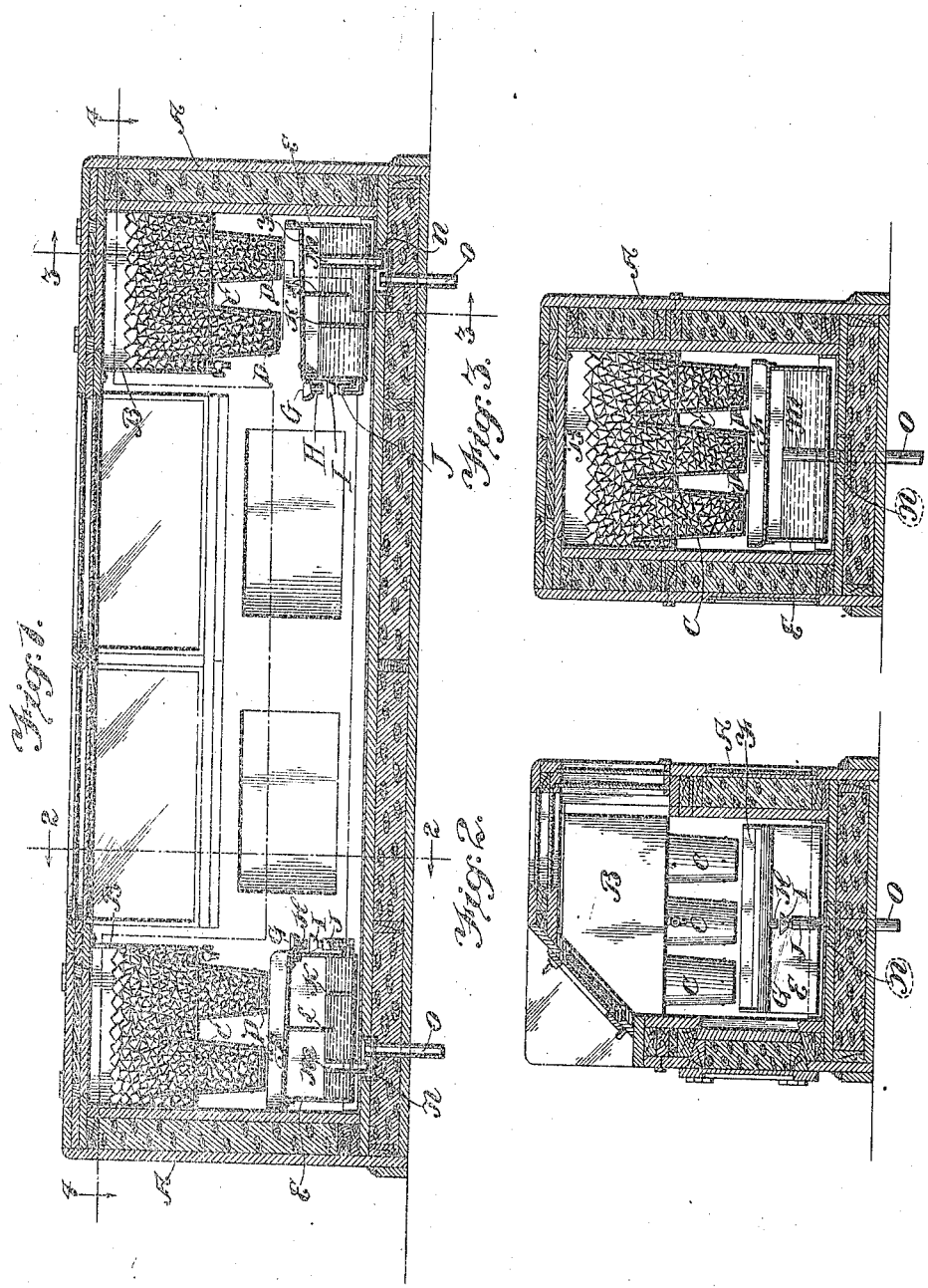

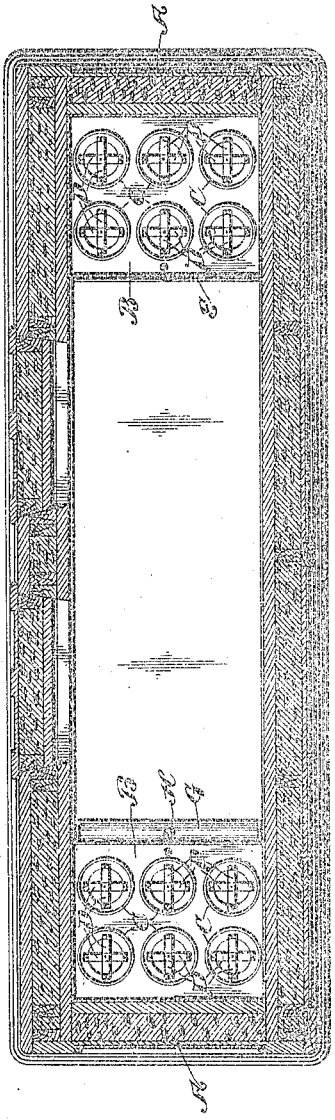
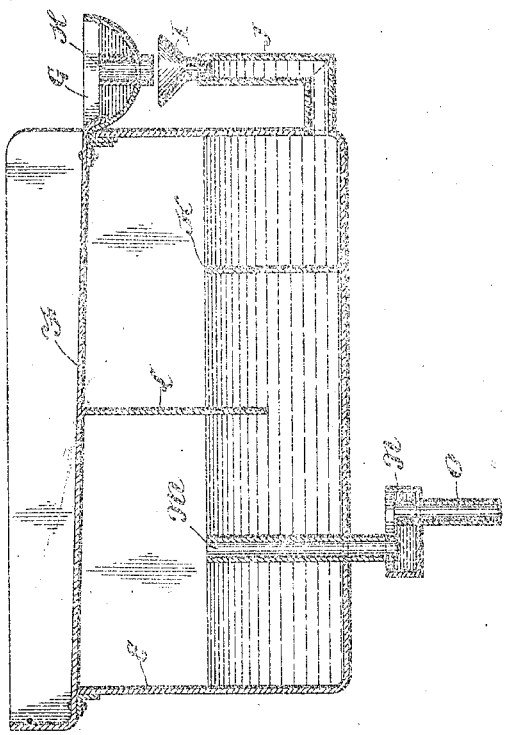

GUSTAV J. GRUENDLER, OF ST. LOUIS, MISSOURI.

REFRIGERATOR.

1,266,679.

Specification of Letters Patent.  Patented May 21, 1918.

Application filed November 2, 1916. Serial No. 129,353.

*To all whom it may concern:*

Be it known that I, GUSTAV J. GRUENDLER, a citizen of the United States, residing in St. Louis and the State of Missouri, have invented a new and useful Improvement in Refrigerators, of which the following is a full, clear, and exact specification, reference being had to the accompanying drawings, which form a part thereof.

My invention relates to refrigerators in which the cooling is brought about by ice or preferably a mixture of ice and salt placed in a container in the refrigerator.

The object of my invention is to provide a form of tank in the refrigerator in which the water or brine from the container shall be caught and retained for a time, so as to aid in cooling the interior of the refrigerator, by making the water or brine travel in a zig-zag path through the tank from its place of entrance thereto to the place of exit therefrom; and a further object of my invention is to provide a tank for catching water or brine from the container which shall be so constructed that the brine will be admitted to the lower part of the tank, where the liquid is coldest, and be discharged from the tank at the upper part, where the liquid is warmest.

My invention is fully shown in the accompanying drawings where similar letters are used on the various drawings to designate similar parts. Figure 1 shows a longitudinal vertical section of a refrigerator embodying my invention; Fig. 2 is a sectional view along the line 2—2 of Fig. 1; Fig. 3 is a sectional view along the line 3—3 of Fig. 1; Fig. 4 is a sectional view along the line 4—4 of Fig. 1; Fig. 5 is an enlarged sectional view showing details of construction of parts of my invention.

Referring to the figures, A is the casing of the refrigerator, which is preferably made of wood and which has its walls formed of insulating material to prevent heat from entering the refrigerator from exterior sources. B is a container which is preferably provided with conical shaped dependent portions C having their lower ends open and provided with crossbars D which prevent the ice from dropping through the parts C while allowing the water or brine resulting from the melting of the ice to drain away. E is a tank adapted to receive the brine from the container B, and is provided with a drip-pan F into which the brine falls and by means of which it is discharged into the tank E. The refrigerator illustrated in the drawings is provided with two containers, one at each end of the casing A, and each container is provided with a drip tank. The drip tank shown in Fig. 5 is provided with a trough G which has in it an overflow pipe H. The bottom of the drip-pan F slopes toward the trough so that brine which falls into the pan runs into the trough G and fills it to the top of the overflow pipe H, and then runs down through this overflow pipe into the funnel-shaped mouth I of the inlet pipe J, by means of which the brine is discharged into the tank near the bottom thereof. K is a vertical baffle plate, projecting upwardly from the bottom of the tank, over which the brine passes as it travels through the tank. L is a vertical baffle plate which projects downwardly in the tank to near the bottom but does not touch the bottom of the tank so that the brine in passing through the tank must pass downward and under the baffle L. M is an overflow pipe which preferably projects upwardly through the bottom of the tank. The lower end of the overflow pipe M projects downwardly in the trap N formed at the upper end of the drain pipe O, thus sealing the overflow pipe M.

The brine resulting from the melting of the ice in the container B drains through the openings between the bars D and falls onto the drip-pan F, and from there passes to the lower part of the tank E where the colder brine accumulates. The brine accumulates in the tank until it flows over the top of the baffle K and then it flows downwardly and passes under the baffle L, and then the warmer brine passes upwardly through the space to the left of the baffle L and enters the overflow pipe M through which it passes down to the trap N, from which it passes away through the drain pipe O. By this construction the brine enters the tank near the bottom thereof, where the coolest brine tends to collect, and passes away from the tank from that part where the warmest brine tends to collect. Since the upper end of the overflow pipe M is at some distance above the bottom of the tank E, the brine is maintained in the tank at or above the level of the upper end of the overflow pipe. The baffles K and L make the brine travel in a zig-zag course through the tank from the place of entrance thereto to the overflow pipe. The object of the overflow pipe H in the trough G is to maintain the brine in this trough at or above a predetermined level. By causing the brine to enter the tank at or near the bottom thereof, where the brine is coldest, and be discharged therefrom where the brine is warmest, and at the same time causing the brine to flow through the tank in a zig-zag course the tank is rendered more effective in cooling the interior of the refrigerator.

The tank may be made of any convenient size or shape and may be supported in any suitable manner, and the drip-pan may be supported in any suitable way to catch the brine from the container B.

What I claim as new and desire to secure by Letters Patent, is:

1. A refrigerator comprising a casing, a container for ice and salt having an opening through which brine may drain, a brine tank, a trough, a drip-pan adapted to catch the brine from said container and discharge it into said trough, an inlet pipe having its lower end connected to said tank and its upper end adapted to receive the brine from said trough, an overflow pipe for said tank, and baffles in said tank between said overflow pipe and said inlet pipe.

2. A refrigerator comprising a casing, a container for ice and salt having an opening through which brine may drain, a brine tank, a trough, a drip-pan adapted to catch the brine from said container and discharge it into said trough, an overflow pipe for said trough, an inlet pipe having its lower end connected to said tank and its upper end adapted to receive the brine discharged from said overflow pipe of said trough, a sealed overflow pipe for said tank, and vertical baffle plates in said tank between said overflow pipe and said inlet pipe.

In witness whereof I have signed my name to this specification.

GUSTAV J. GRUENDLER.